United States Patent
Nilsen

(10) Patent No.: US 6,702,536 B2
(45) Date of Patent: Mar. 9, 2004

(54) THREADED FASTENER NUT WITH ANTI-CROSS THREADING RADIUSED FEATURES

(75) Inventor: Martin J. Nilsen, Hampshire, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/967,159

(22) Filed: Sep. 28, 2001

(65) Prior Publication Data

US 2003/0063962 A1 Apr. 3, 2003

(51) Int. Cl.$^7$ ................................................ F16B 37/06
(52) U.S. Cl. ...................... 411/171; 411/427; 411/386
(58) Field of Search ................... 411/386, 427, 411/171, 436

(56) References Cited

U.S. PATENT DOCUMENTS

| | | |
|---|---|---|
| 447,775 A | 3/1891 | Higbee |
| 2,040,383 A | 5/1936 | Jasper |
| 2,073,467 A * | 3/1937 | Demboski et al. ............ 470/21 |
| 2,374,690 A | 5/1945 | Laue |
| 2,595,830 A * | 5/1952 | Demboske ................ 411/171 |
| 2,983,180 A | 5/1961 | Sygnator |
| 3,006,003 A | 10/1961 | Johnson |
| 3,101,210 A | 8/1963 | Johnson |
| 3,933,074 A | 1/1976 | Witte et al. |
| 4,469,465 A * | 9/1984 | Andrus ..................... 403/282 |
| 4,750,851 A | 6/1988 | Thomey |
| 4,907,930 A | 3/1990 | Peterson |
| 4,915,560 A | 4/1990 | Peterson et al. |
| 5,064,327 A | 11/1991 | Hughes |
| 5,244,327 A | 9/1993 | Whitesell |
| 5,419,667 A | 5/1995 | Avgoustis |
| 5,618,144 A * | 4/1997 | Leistner ..................... 411/427 |
| 5,704,749 A | 1/1998 | Landgrebe |
| 5,791,849 A | 8/1998 | Goodwin et al. |
| 5,997,231 A | 12/1999 | Goodwin et al. |
| 6,062,786 A * | 5/2000 | Garver et al. .............. 411/386 |
| 6,328,515 B1 * | 12/2001 | Donovan .................. 411/386 |
| 6,439,818 B1 * | 8/2002 | Nagayama ................ 411/436 |

* cited by examiner

Primary Examiner—Flemming Saether
Assistant Examiner—Jori Schiffman
(74) Attorney, Agent, or Firm—Mark W. Croll; Paul F. Donovan

(57) ABSTRACT

A nut fastener is formed with anti-cross threading features that include a rounded or chamfered edge at the entry end to the nut, followed by an unthreaded cylindrical counterbore that extends axially from the entry end to the threaded section of the bore. The rounded or chamfered entry end prevents cross threading and the unthreaded section is of sufficient length to ensure substantially collinear alignment between the threaded fastener and the correspondingly threaded nut before threaded engagement occurs. An optional radiused portion is formed between the unthreaded and threaded sections of the nut to further prevent cross threading. In a preferred embodiment, the anti-cross threading nut is a weld nut formed with weld protrusions which enable the nut to be welded to a large structural member before mating engagement with a threaded fastener occurs.

13 Claims, 2 Drawing Sheets

THREADED FASTENER NUT WITH ANTI-CROSS THREADING RADIUSED FEATURES

FIELD OF THE INVENTION

The present invention relates generally to threaded fasteners such as screws, bolts and nuts and, more particularly, to anti-cross threading fasteners.

BACKGROUND OF THE INVENTION

Threaded fasteners are used in the construction or fabrication of most articles of manufacture such as machines, automobiles, trains, planes, engines, etc., and such threaded fasteners may take the form of bolts, screws, studs, rods (all of these terms being used interchangeably herein) or other substantially round members having uniform, nonuniform or tapered external helical threads that are threadedly engaged into mating threaded fasteners such as nuts, bolts or holes having substantially matching internal helical threads. To ensure proper engagement between externally and internally threaded fasteners, it is important that the longitudinal axes of these parts are in substantially collinear alignment before threaded engagement occurs in order to prevent the occurrence of cross threading.

Cross threading generally occurs when there is a misalignment between the externally threaded member, typically a screw or bolt, and the internally threaded member, typically a nut or other threaded hole. Specifically, cross threading is the result of the threads of the two members attempting to engage each other when out of alignment. When this occurs, the two members are not collinear with each other and wedging of the threads will occur as the threaded helixes are rotated against each other. If the rotation continues, as is often the case, the threads on one or both members will become structurally damaged.

While the problem of cross threading is significant under any circumstances in terms of engendering costly downtime and disruption in production, the problem of cross threading is compounded in situations where either the threaded stud or nut is first attached, for example by welding, to a large panel-like or other structural member which then facilitates threaded attachment of another part thereto. In other words, it is typical for weld nuts to be welded to such panels or structural members in one production step (e.g. during the manufacture of an automotive vehicle) to provide an internally threaded means for securing another member to the first mentioned member in a subsequent manufacturing step. In this subsequent step, the cross threading problem is particularly significant since it requires the first mentioned structural member to be repaired and recycled for the purpose of reuse at a later time.

SUMMARY OF THE INVENTION

The present invention is directed to an anti-cross threading nut comprising a nut body having first and second open ends at opposite sides thereof and a generally cylindrical passage extending between the first and second open ends. A plurality of threads extend over a predetermined axial extent of the passage to define a threaded region. A remaining portion of the passage is unthreaded up to the first end to define an unthreaded counterbore. The first end defines an inlet opening into the passage for receiving a correspondingly threaded shank member. The inlet opening is radiused or chamfered to prevent cross threading engagement of the shank member with the inlet opening. Advantageously, the shank member proceeds through the unthreaded region which forces the shank to become substantially collinearly aligned with the threaded region of the nut before actual threaded contact occurs. In this manner, cross threading is effectively minimized or eliminated.

In the preferred embodiment, the first inlet opening is radiused. Optionally, though preferably, a second lead-in radius is disposed at the intersection between the threaded region and the unthreaded counterbore. This second lead-in radius further minimizes the possibility of cross threading by providing a smooth transition for the threads of the shank member to pass through the unthreaded counterbore into proper threaded engagement with the threaded region.

The length and diameter of the unthreaded counterbore is structured to limit misalignment between the threaded region and the correspondingly threaded shank member to less than about 10°, and preferably less than about 5°. As a result of extensive testing, it has been determined that there is a significant reduction in cross threading at less than such angles of misalignment.

According to one aspect of the present invention, the design of the counterbore is controlled by the thread pitch. In a preferred embodiment, the axial extent or depth of the unthreaded counterbore is equal to at least about four times the thread pitch. This tends to force the before mentioned stud member and threaded region of the nut into correct collinear alignment wherein the threads of the stud and nut members will rotationally engage each other to properly fasten as intended.

The first lead-in radius is preferably at least about 1.5 times the pitch of the nut threads. This enables the thread surface of the stud to smoothly pass into the entrance opening of the unthreaded counterbore without binding or cross threading contact therebetween.

The diameter of the counterbore is machined to equal the nominal diameter of the threaded region plus about 10% of the thread pitch in order to ensure sufficiently snug guiding contact which will enable the aforesaid substantially collinear alignment to occur at the time of threaded engagement.

The above mentioned features may be used in any type of nut applications, such as hex nuts, hex flange nuts, or even one or both ends of a rod coupler. In one preferred embodiment of the present invention, however, the above mentioned anti-cross threading features are formed in a weld nut that includes weld protrusions on a side thereof including the first open end. This enables the nut to be welded to a structural member to facilitate subsequent threaded connection of this member to another member by means of a connecting threaded stud. In this type of environment in which the nut is previously securely welded to a larger structural member, the anti-cross threading features of the invention are particularly important since cross threading has more damaging and costly consequences.

In weld nut applications, the first open end is preferably formed on an elongated pilot section containing the unthreaded counterbore so as to axially offset the open end from the weld protrusions in a direction away from the threaded region of the nut. This pilot section advantageously prevents weld spatter from entering the unthreaded counter bore and possibly contaminating the threads.

In this weld nut embodiment, the weld nut is preferably formed with a material that has been hardened during the nut manufacturing process such as by application of heat in a known manner. By hardening the nut material, the nut threads also become hardened to provide added strength. In accordance with another feature of the invention, however, the hardened weld protrusions are selectively annealed to enable the weld protrusions to function properly to obtain appropriate welded contact between the nut and a supporting structural member. It will be appreciated that the feature of selectively annealing the weld protrusions in an otherwise hardened nut may be used with or without the above mentioned anti-cross threading features.

Accordingly, in accordance with a different aspect of the invention, there is provided a weld nut comprising a nut body formed with at least one weld protrusion, and wherein the nut body includes hardened material and the weld protrusion is an annealed portion. According to this aspect of the invention, the entire nut body, including the weld protrusion, is preferably formed from the same hardened material and the weld protrusions are then selectively annealed to form the annealed portion.

A method of correcting misalignment between a stud and a nut of a threaded fastener assembly is also disclosed. In accordance with this aspect of the invention, the method comprises relatively inserting a threaded end of a stud into a radiused or chamfered entrance opening of a pilot member disposed forwardly adjacent the nut. If there is misalignment, the stud threads contacting the radius or chamfered opening will not cross thread therewith. The threaded end of the stud is then relatively axially advanced through the pilot member which is not correspondingly threaded in relation to the stud thread. This relative axial advancement occurs over a predetermined axial distance that forces the stud axis to enter into substantially collinear alignment with the thread axis of the nut before the stud thread affects threaded contact with the nut thread. Relative rotation between the nut and stud will subsequently cause proper threaded engagement to occur without cross threading.

Other and further objects, features and advantages will become apparent from the following description of the presently preferred embodiment of the invention.

Figure 1:
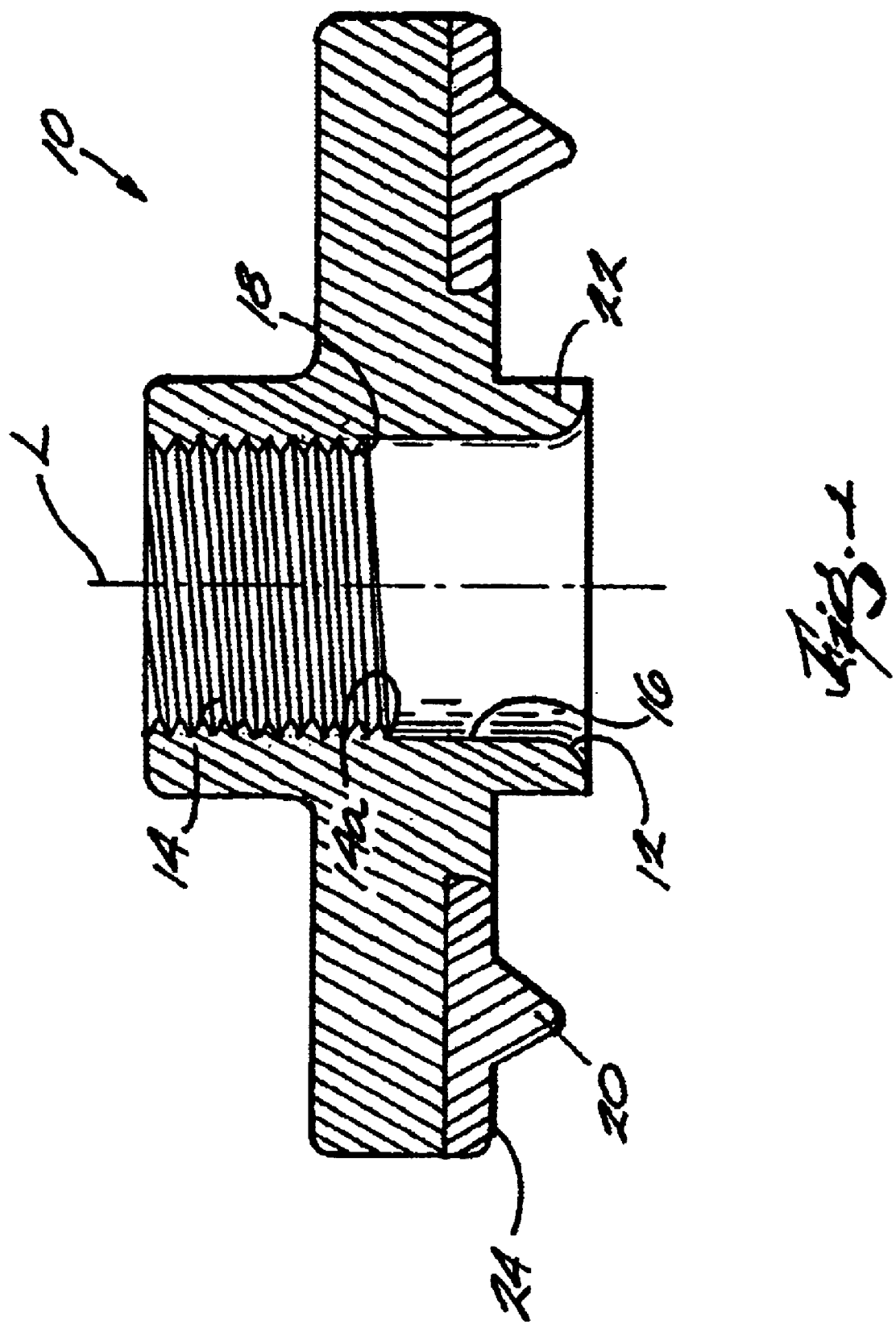
FIG. 1 is a schematic cross sectional elevational view of a preferred embodiment of the present invention.
Figure 2:
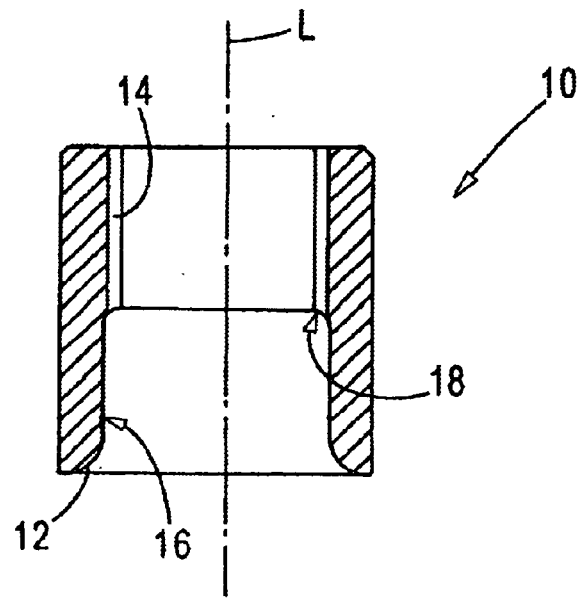
FIG. 2 is a schematic cross sectional elevational view of a preferred embodiment of the present invention with an internal lead in radiussed portion 18.
Figure 3:
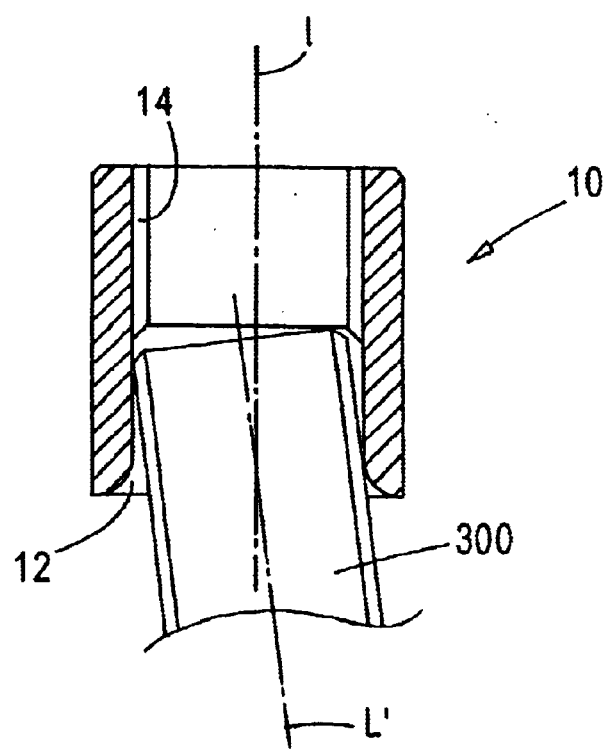
FIG. 3 is a schematic cross sectional elevational view showing an acceptable level of misalignment between the nut of the present invention and a correspondingly threaded shank member 300 having an axis L'.

Before the embodiments of the invention are explained in detail, it is to be understood that the invention is not limited in its application to the details of construction and the arrangements of components set forth in the following description or illustrated in the drawing. The invention is capable of other embodiments and of being practiced or being carried out in various ways. Also, it is understood that the phraseology and terminology used herein are for the purpose of description and should not be regarded as limiting. The use of letters to identify steps of a method or process is simply for identification and is not meant to indicate that the steps should be performed in a particular order.

DETAILED DESCRIPTION OF THE PREFERRED EMBODIMENT

FIG. 1 is an illustration of an anti-cross threading nut 10 having novel and unique anti-cross threading and self alignment features constructed in accordance with the principles of the present invention. In the threaded fastener environment in which one embodiment of the invention is intended to be used, when the opposing thread helixes address each other, there is a natural tendency to collinearly align their respective mating planes during rotation. However, if the initial misalignment between the longitudinal axis of an external threaded fastener and the internal threads of the corresponding nut is significant, then this misalignment will disadvantageously cause the threads to engage each other in a structurally deforming manner that causes undesirable cross threading to occur and which prevents proper threaded engagement between the fastener parts.

To eliminate cross threading, a nut 10 according to one aspect of the present invention is formed with a radiused or chamfered inlet or entrance opening 12 through which the external thread of the stud or first member initially enters the nut. If there is misalignment between the first member and nut axis L, there will be a tendency for the external fastening threads to contact the edges defining the entrance opening 12. If these edges are sharp, the external threads could deformably engage with the entrance opening 12 and such engagement could cause structural damage to one or both of the opening 12 and the external threads. To minimize this type of cross threading, the edge surfaces defining the entrance opening 12 to the nut threads 14 are preferably radiused to present a smooth rounded surface that will be resistant to such undesirable binding or cross threading contact with the leading and subsequent threads of the external threaded fastener. Preferably, the radius is at least 1.5 times the pitch of the external or nut thread 14.

It may be possible to form the entrance or inlet opening 12 with a chamfered surface (not shown in detail) instead of a radiused surface so long as the transitional angles between the respective surfaces defining the chamfer do not give rise to binding contact.

According to another aspect of the present invention, the nut 10 includes an unthreaded counterbore 16 extending a predetermined axial distance between the entrance end 12 of the nut and the leading axial nut thread 14a. The purpose of the unthreaded counterbore 16 is to gently but firmly force the threaded fastener into substantially collinear alignment with the nut thread axis L before threaded engagement actually occurs. As a result of experimentation, it has been discovered that the axial length (or depth) of the unthreaded counterbore 16 should preferably be at least four (4) times the pitch of the nut thread 14 and that the diameter of the unthreaded counterbore be equal to at least the nominal diameter of the nut thread plus about 10% of the thread pitch. In this manner, at the time of actual threaded engagement, the external threaded fastener is aligned with the nut thread axis L to an acceptable level (e.g. 10°, preferably 5°, or less) so that cross threading will not occur once threaded engagement commences. By making the length of the unthreaded counterbore 16 longer, in accordance with the principles of the present invention, it will now be appreciated that even greater alignment can occur between the external threaded fastener and the nut threads 14, thus further reducing the possibility of cross threading. Although the length and diameter of the counterbore 16 has been described in terms of their relationship to the thread pitch, it is understood that the length and diameter of the counterbore 16 can be controlled by other fastener characteristics.

Optionally, though preferably, the intersection between the trailing end of the unthreaded counterbore with the threaded region 14 of the nut 10 is preferably formed with a second lead in radiused portion 18 which may have the same curvature characteristics as the first lead in radius opening 12 to provide a continued smooth transition, free of sharp protruding surfaces, that will enable the leading thread of the external threaded fastener to enter into smooth threaded engagement with the leading threads 14a of the internal thread region within the nut. Due to the relative recessed placement of the second lead in or entrance portion 18 relative to the entrance or inlet opening 12, it is also possible to form the second lead in radius with a different curvature. Desirably, this different curvature is at least 0.6 times the thread pitch.

As discussed extensively above, the foregoing features force the external threaded fastener to align within the bore 16 prior to threaded engagement and, once in the bore, tend to limit the entry angle to less than about 10°, preferably less than about 5°, where cross threading is significantly reduced.

The foregoing anti-cross threading features may be utilized in any type of nut fastener as mentioned above. However, these anti-cross threading features will find particular preferential use in nuts 10 that are attached to large structural components before subsequent threaded attachment to another structural component occurs, such as in the manufacture, for example, of automotive and other types of vehicles or large machinery. In this type of environment, it will be particularly appreciated and understood by persons skilled in the art that disadvantageous cross threading between mating threaded fasteners could have highly undesirable consequences. For example, once the nut formed with the cross threading features of the invention is securely fastened to one structural component during an earlier manufacturing step, any subsequent cross threading occurring in a later manufacturing or assembly step will necessitate a disruption in the production cycle and perhaps require either scrapping of the damaged cross threading components or costly repair in order to make reuse possible at a subsequent time. Therefore, in accordance with another aspect of this invention, the anti-cross threading features of the present invention find highly preferred use in weld nuts which are formed with weld protrusions 20 to facilitate welding of the nut to a structural member (not shown but easily accomplished in a manner known to persons skilled in this art). In a weld nut environment, the inlet or entrance opening 12 as well as the leading portion of the unthreaded counterbore 16 is preferably formed in a pilot section 22 that is axially offset from the weld protrusions 20 in a direction facing away from the nut threads 14. With this feature, weld splatter that occurs during the welding process is not likely to enter into the unthreaded counterbore 16 where it might otherwise disadvantageously coat the nut threads 14 and cause cross threading to occur. The axial length of the pilot section 22 from the surface 24 of the weld protrusion 20 preferably is equal to or less than the thickness of the panel material to which the nut 10 is being attached in order to prevent the pilot section from protruding from the opposite side of the panel surface.

It is highly desirable in certain applications to form the weld nut 10 with a hardened material in order to improve thread strength and the extent to which torque may be applied to provide secure fastening engagement. However, since it may be disadvantageous to equally harden the material forming the weld protrusion 20, another preferred feature of this invention is the selective annealment of the weld protrusions so that these protrusions are not as hard as the remaining material of the nut body including the threads 14. While this aspect of the invention is preferably used in combination with the anti-cross threading features disclosed hereinabove, it is also within the scope of this specification to provide a weld nut formed with selectively annealed weld protrusions that do not necessarily include the anti-cross threading features of this invention.

Variations and modifications of the foregoing are within the scope of the present invention. It is understood that the invention disclosed and defined herein extends to all alternative combinations of two or more of the individual features mentioned or evident from the text and/or drawing. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An anti-cross threading nut, comprising:

a nut body having first and second open ends at opposite sides thereof and a passage extending between said first and second open ends;

a plurality of threads extending over a predetermined axial extent of said passage to define a threaded region, a remaining portion of said passage being unthreaded up to said first end to define an unthreaded counterbore;

said first end defining an inlet opening into said unthreaded counterbore for receiving a correspondingly threaded shank member, said inlet opening being radiused to define a first lead in radius to prevent cross threading engagement of said shank member with said inlet opening;

wherein said nut is a weld nut formed with at least one weld protrusion; and said first open end is axially offset from said at least one weld protrusion in a direction away from the threaded region to prevent weld splatter from entering the unthreaded counterbore.

2. The anti-cross threading nut of claim 1, further comprising a radiused portion disposed at the intersection between the threaded region and the unthreaded counterbore, said radiused portion being curved with respect to said passage to define a second lead in radius.

3. The anti-cross threading nut of claim 2, wherein the diameter of a cylindrical section the counterbore between said curved peripheral edge of said inlet opening and said radiused portion is equal to the nominal diameter of the threaded region, which is a cylindrical threaded region, plus about 10% of the thread pitch.

4. The anti-cross threading nut of claim 2, wherein said second lead in radius is at least 0.6 times the pitch.

5. The anti-cross threading nut of claim 4, wherein said first lead in radius is at least 1.5 times the pitch.

6. The anti-cross threading nut of claim 1, wherein the length of the unthreaded counterbore is structured to limit misalignment between the threaded region and the correspondingly threaded shank member to less than about 10°.

7. The anti-cross threading nut of claim 6, wherein the unthreaded counterbore is structured to limit misalignment between the threaded region and the correspondingly threaded shank member to be less than about 7°.

8. The anti-cross threading nut of claim 6, wherein the unthreaded counterbore is structured to limit misalignment between the threaded region and the correspondingly threaded shank member to be less than about 5°.

9. The anti-cross threading nut of claim 1, wherein the axial extent or depth of the unthreaded counter bore is equal to about 4 times the thread pitch.

10. The anti-cross threading of claim 9, wherein said first lead in radius is greater than the pitch.

11. The anti-cross threading nut of claim 10, wherein said first lead in radius is at least 1.5 times the pitch.

12. The anti-cross threading nut of claim 1, wherein said nut is a weld nut formed with weld protrusions on a side thereof including said first open end.

13. The anti-cross threading nut of claim 12, wherein said weld nut is formed with a hardened material and said weld protrusions are annealed portions that are not as hard as the hardened material.

* * * * *